June 26, 1951  G. C. WILSON  2,558,026
METHOD OF MOLDING ARTICLES
Filed Dec. 30, 1947  3 Sheets-Sheet 1
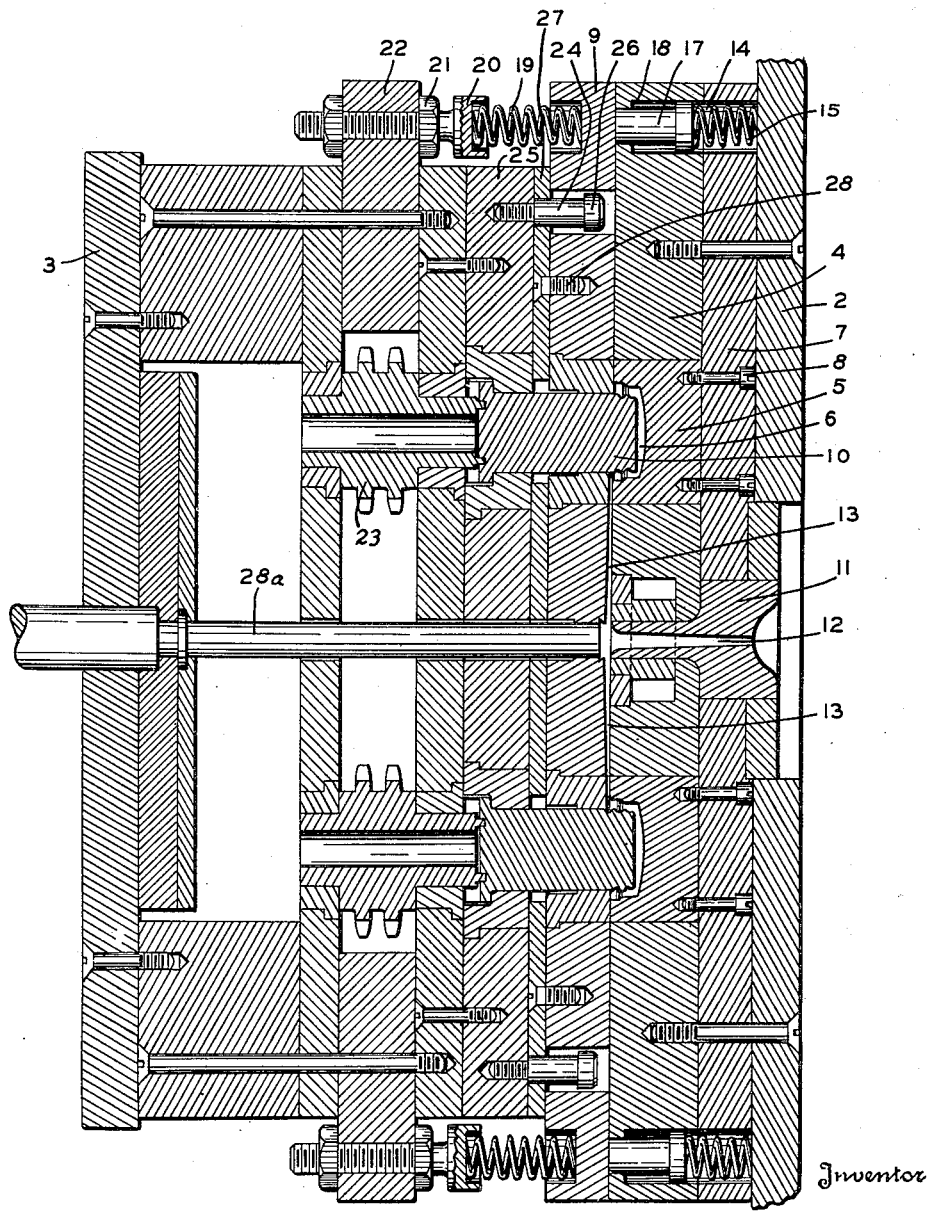
Fig. I June 26, 1951
G. C. WILSON
2,558,026
METHOD OF MOLDING ARTICLES
Filed Dec. 30, 1947
3 Sheets-Sheet 2
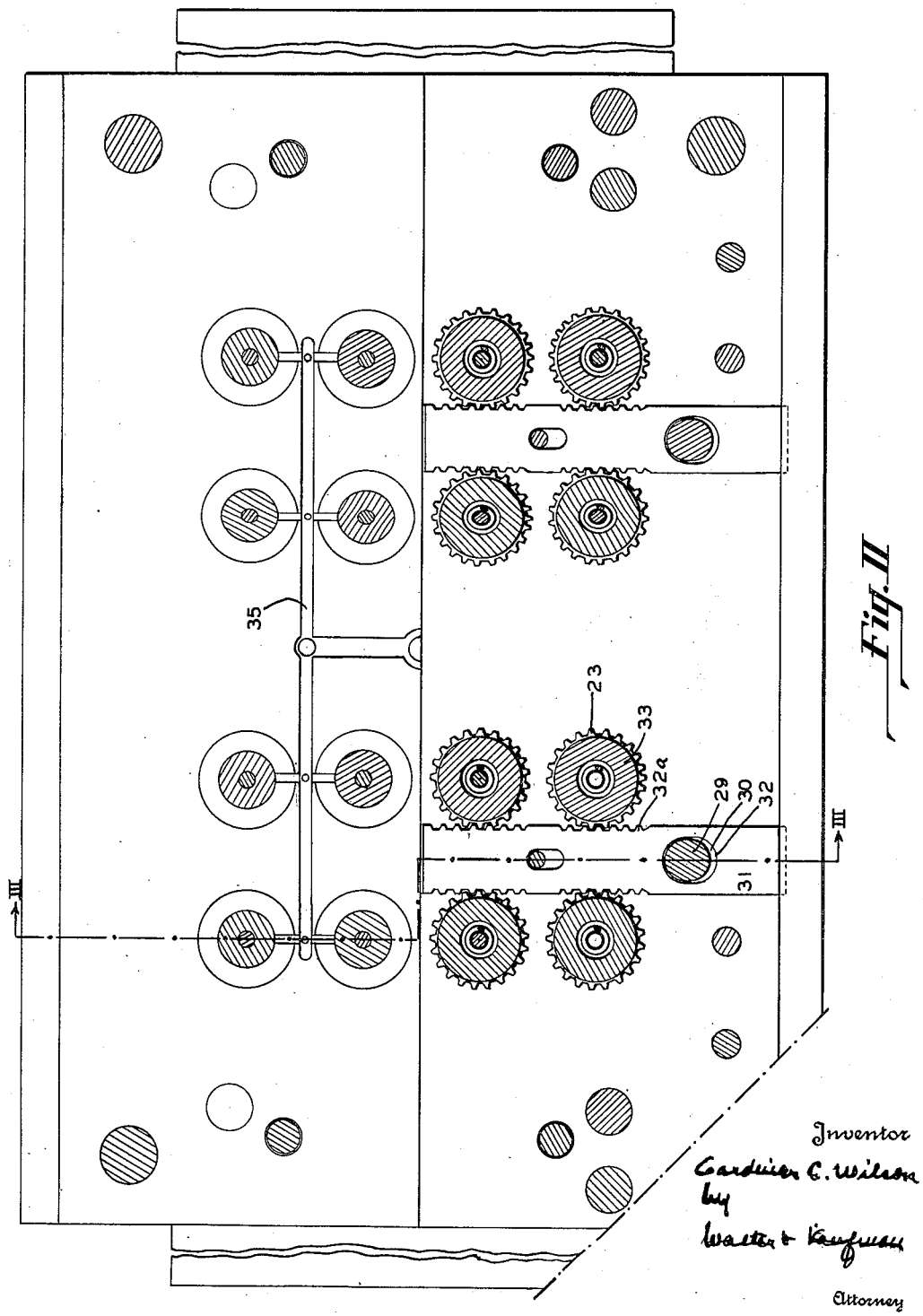
Fig. II

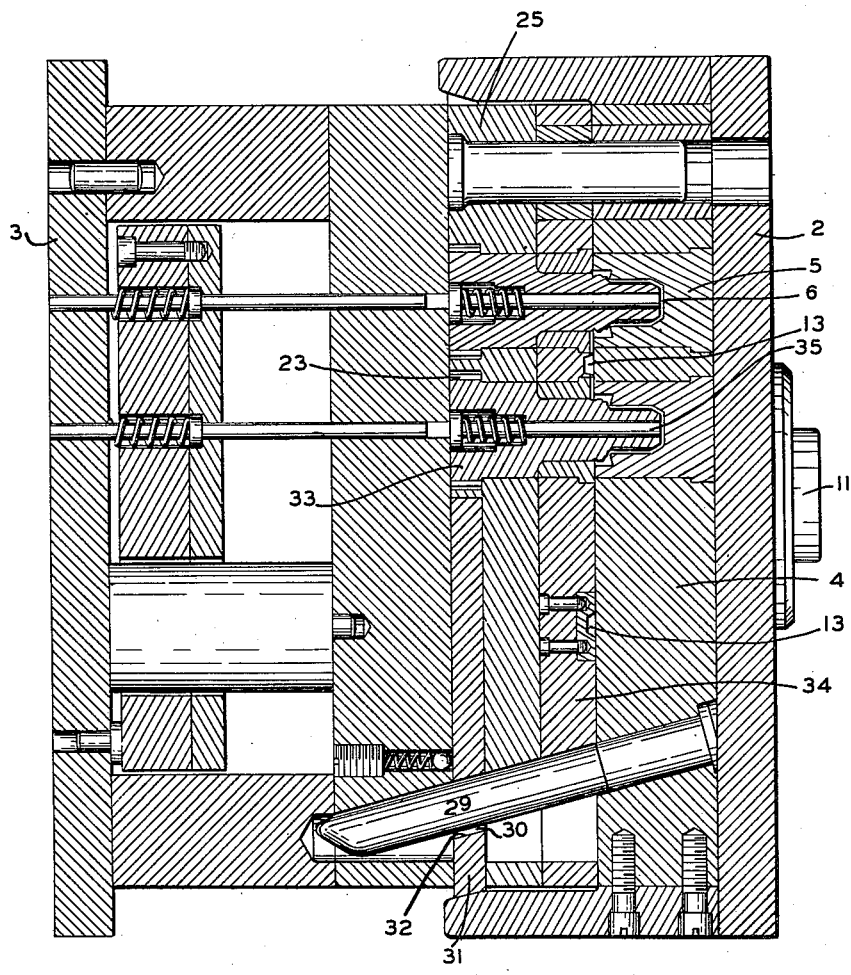
Fig. III

Patented June 26, 1951

2,558,026

UNITED STATES PATENT OFFICE 2,558,026

METHOD OF MOLDING ARTICLES

Gardiner C. Wilson, Lancaster, Pa., assignor to Armstrong Cork Company, Lancaster, Pa., a corporation of Pennsylvania Application December 30, 1947, Serial No. 794,566

9 Claims. (Cl. 18—55)

This invention relates to a method of molding articles in an injection molding device in which a plurality of molded pieces are formed as a unit and, more particularly, to a method in which the gate connecting the articles is severed by rotary motion imparted to the molded articles before they are released from the force plugs.

In the methods used heretofore in molding articles on injection molding devices such as the one shown in my Patent No. 2,339,443, it has been common practice to mold a plurality of articles and break the gate by hand after the articles have been removed from the mold. This has also been accomplished by constructing the mold members in such manner that the gate is severed when the mold opens. This is disclosed in my copending patent application, Serial No. 450,541, filed July 11, 1942 now Patent No. 2,457,336. In the former case a great deal of time is involved in breaking apart the pieces, while in the latter case the cost of constructing the mold is considerably greater than necessary when using the present invention.

An object of this invention is to provide a method of producing molded articles on an injection molding machine in which the gate is severed by rotating the molded articles before the articles are removed from the mold unit.

A further object of this invention is to provide a method of producing screw-threaded molded articles on an injection molding machine in which the molded articles are partially unscrewed from the force plugs and are thereafter stripped from the force plugs.

A still further object of this invention is to provide a method of producing molded articles on an injection molding machine in which the gate is severed by turning the molded articles radially with respect to their longitudinal axes.

In the manufacture of cup-shaped molded articles from plastic composition such as polymerized ethylene, commonly known as "Polythene," I have found that the gate can be severed by radially turning the molded articles about their longitudinal axes at the time the press is opening and before the molded articles have been removed from the force plugs. This method overcomes the expense and time required to sever the gate by methods used heretofore.

In the production of screw-threaded molded articles, I have found that if the gate is severed immediately after the mold opens by rotating the force plugs and molded articles, and the articles are thereafter stripped from the force plugs, the thread on the articles is permanently deformed to a considerable extent. In order to overcome this difficulty, I have developed a method of producing molded articles which makes it possible to break the initial bond between the force plugs and the molded articles by partially unscrewing the force plugs from the molded articles and thereafter stripping the articles from the force plugs.

During this initial unscrewing the molded articles are held from rotation by reason of their frictional engagement with the interior of the mold cavities. This frictional engagement between the molded articles and the mold cavities may be enhanced by the provision of a decorative design on the wall of the cavities which will produce a decoration on the molded articles.

When the mold has opened far enough to remove the molded articles completely from the cavities, the frictional drag between the rotating force plugs and the molded articles is greater than the resistance of the gate to rupture. This frictional drag causes the molded articles to rotate with the force plugs, after the gate has been severed. After the initial unscrewing has been accomplished and the gate has been severed, the articles are then stripped from the force plugs by means of a stripper plate which engages the bottom edge of the skirt of the articles and strips them over the remaining thread on the force plugs with a minimum of distortion to the conformation of the thread.

When using my method in the production of nonthreaded articles, I have found it desirable to allow the mold to open at least a short distance before rotating the force plugs. The purpose of this slight opening action is to break the bond between the exterior of the molded articles and interior of the mold cavities.

In order that my invention may be more readily understood, it will be described in connection with the attached drawings in which Figure I is a sectional view of an injection molding device illustrating a mold suitable for making threaded articles;

Figure II shows a plan view of a multiple-cavity mold, partially broken away to show the force plug rotating mechanism; and Figure III is a cross-sectional view taken on the line III—III of Figure II.

My copending patent application, Serial No. 794,567, filed concurrently herewith, shows an apparatus suitable for carrying out the method of my invention in producing screw-threaded articles.

Referring to Figure I, there is shown an injection molding machine having a foundation plate 2 and a movable plate 3. Attached to the foundation plate 2 is a mold cavity plate 4 having inserts 5 which form a mold cavity 6. Cavity inserts 5 are secured to a plate 7 by means of machine screws 8 which pass through plate 7 and are in threaded engagement with the inserts 5. Plate 7 is, in turn, secured to foundation plate 2. Attached to movable plate 3 is a mold plate 9 which has cavities in axial alignment with the cavities 6 in mold plate 4. Passing through the cavities in mold plate 9 are suitable force plugs 10 made of a suitable configuration to form the inner surface of the articles to be molded; the outer surface being formed by the cavity 6 in the insert 5. These force plugs may be screw-threaded or plain, depending upon the type of product being manufactured. In the center of the foundation plate 2 is a sprue bushing 11, having a sprue 12 through which molding composition is directed to the runner channels 13 which lead to the mold cavities 6. The runner channels 13 connect the sprue 12 with the cavities 6 and may be formed in either the fixed mold plate 4 or the movable mold plate 9, or they may be formed partially in each plate.

The plates 4 and 7 are provided with one or more recesses 14 containing springs 15 which are compressed between foundation plate 2 and headed pins 17 (see Figure I). Forward movement of the pins 17 is limited by shoulders 18 provided in the pin recesses 14. Pins 17 engage the surface of movable mold plate 9. Movable mold plate 9 is actuated by springs 19 which are compressed between mold plate 9 and recesses 20 which are a part of adjusting bolts 21 passing through plate 22. In order to carry out the method of my invention, it is essential that springs 19 be of lesser strength than springs 15. This can be accomplished by using fewer springs 19 than springs 15.

In carrying out my method to produce threaded molded articles, the mold is closed and a suitable molding composition such as polymerized ethylene or other suitable molding composition is injected into the mold through the sprue 12 and runner channels 13 completely filling the cavities 6. After the molding composition has had sufficient time to set, the mold opens by means of actuating mechanism not shown in the drawings. When the mold opens, plate 9 is forced away from fixed plate 4 by means of springs 15 which apply a force to pins 17. As soon as the mold starts to open, the force plugs 10 are rotated by a suitable means 23 which may be gears or sprockets attached to the force plugs by suitable linkage. Sprockets 23 may be rotated by any suitable rotating mechanism not shown in the drawing. During this initial rotation of the force plugs, the molded pieces are held from rotation by the frictional engagement of their outer surface by the inner surface of the mold cavities 6. This accomplishes partial unscrewing of the molded articles from the force plugs. When the mold has opened sufficiently far for the heads of the pins 17 to engage the shoulders 18 of the mold plate, springs 15 no longer hold springs 19 under compression. Springs 19 then expand, forcing movable mold plate 9 forward. At the same time that the mold has opened sufficiently far for the heads of the pins 17 to engage the shoulders 18, the molded articles will have been withdrawn from the mold cavities and the frictional drag between the rotating force plugs and the molded articles is sufficiently great to cause the molded articles to rotate with the force plugs. This rotation of the molded articles severs the gate between the molded article and the molding composition remaining in the runner channels 13.

While the molded articles are being rotated by the force plugs, movable mold plate 9 in its path of travel forward by means of springs 19 engages the under surfaces of the skirts of the molded articles and urges them forward, thus stripping them from the force plugs, and the molded articles are free to drop from the mold into any suitable receptacle. The forward movement of the movable mold plate 9 is limited by pins 24 which are positioned in recesses in the movable mold plate 9 and are in threaded engagement with plate 25. Pins 24 are provided with heads 26 which engage plate 27 which is secured to the movable mold plate by means of machine screws 28. It will be clear from this that when the heads 26 of pins 24 are engaged by plate 27, the forward movement of plate 9 will cease.

The molding composition remaining in the runner channels 13 and the sprue 12 may be ejected from the mold by a suitable ejector 28a shown in Figure I.

While I have described the above method showing the use of springs to urge plate 9 forward it will be understood that this can be accomplished by using other means such as hydraulic or pneumatic cylinders.

In using hydraulic cylinders or pneumatic cylinders in carrying out my invention, it will be understood that the piston actuating mold plate 6 can be suitably controlled so that the plate will not impart a stripping force on the molded article until the mold has opened sufficiently to accomplish the initial unscrewing and gate-severing referred to earlier in this application. In utilizing a structure of this kind it is obvious that it will not be necessary to provide means on mold plate 5 to hold mold plate 9 inactive during the initial phase of the mold-opening cycle.

In another embodiment of my invention illustrated in Figures II and III, I have shown a method of molding nonthreaded articles. In this method the procedure of supplying molding composition to the mold cavities is the same as that described earlier. In molding non-threaded articles, the force plugs are provided with longitudinal grooves which form longitudinal ribs on the interior of the molded articles. In this embodiment, when the mold starts to open it opens a predetermined distance before rotary movement is imparted to the force plugs. This can be accomplished by means of the conventional diagonal bars 29 which are attached to the stationary mold plate. As the mold starts to open the diagonal bars 29 move freely through openings 30 in gear racks 31. After a predetermined time the diagonal bars 29 engage edges 32 of the openings 30, thereby forcing racks 31 to the right. The gears 32a on racks 31 being in engagement with teeth on the force plugs 33 rotate the force plugs while the mold is opening. The longitudinal grooves of the force plugs being in engagement with the ribs formed in the molded pieces cause the molded pieces to rotate with the force plugs. This rotation severs the gate between the molded pieces and the runner channels.

After the mold has opened a predetermined distance, the molded pieces are stripped from the force plugs by means of stripper plate 34, which engages the under side of the molded pieces and strips them from the outer surface of the force plugs. Inasmuch as these molded articles are highly flexible, I have found it advantageous to provide ejector rods 35 which are forced through the center of the force plugs to urge the closed ends of the molded articles off the force plugs. The excess composition remaining in the injector sprue and the runner channels is also ejected by an ejector which is attached to the same element as ejectors 35.

It will be clear from the above that I have developed a method of molding articles in which the gate connecting the articles is severed by rotating the articles while they are attached to the force plugs forming the inner surface of the molded pieces. It will be obvious to those skilled in the art that this method overcomes many of the disadvantages encountered heretofore in disconnecting a plurality of molded articles which are molded as a single unit.

While I have illustrated and described certain preferred embodiments of my invention, it will be understood that the same is not so limited but may be otherwise practiced within the scope of the following claims.

I claim:

1. In a method of molding an article between complementary mold members and severing the gate attached to the molded article, the steps comprising forming a molded article with a gate attached thereto, rotating the molded article with one of the mold members while positively holding said gate against rotation to thereby sever the gate attached to the article, and thereafter stripping the article from the rotatable mold member by the application of force to the molded article substantially parallel to the axis of rotation of the rotatable mold member.

2. In a method of molding a threaded article between complementary mold members, one of which is threaded, and severing a gate attached to the molded article, the steps comprising forming a molded article with a gate attached thereto, rotating the molded article with the threaded mold member while positively holding said gate against rotation to thereby sever the gate attached to the article, and thereafter stripping the article from the threaded mold member by the application of force to the molded article substantially parallel to the axis of rotation of the threaded mold member.

3. In a method of molding a threaded article between a threaded force plug and a mold cavity and severing the gate attached to the molded article, the steps comprising forming a molded article with a gate attached thereto, rotating the threaded force plug while said molded article is held from rotation by its frictional engagement with the mold cavity, thereby partially unscrewing the molded article from the force plug, removing the molded article from the mold cavity, rotating the molded article with the rotating force plug to apply rotational force to the molded article to sever the gate attached thereto while positively holding said gate against rotation, and thereafter stripping the molded article over the threaded projections of the force plug by the application of force to the molded article substantially parallel to the axis of rotation of the force plug.

4. In a method of molding an article between a rotatable force plug and a mold cavity and severing the gate attached to the molded article, the steps comprising forming a molded article with a gate attached thereto, rotating the molded article while it is in engagement with the rotating force plug to sever the gate attached thereto while positively holding said gate against rotation of said article, and thereafter stripping the article from the force plug by the application of force to the molded article substantially parallel to the axis of rotation of the force plug.

5. In the method of molding an article between complementary mold members and severing the gate attached to the molded article, the steps comprising injecting molding composition into the cavity formed by the complementary mold members, setting the molding composition to form the molded article with a gate attached thereto, separating the mold members, rotating the molded article with one of the mold members while positively holding said gate against rotation to thereby sever the gate attached to the article, stripping the molded article from the rotatable member by the application of force to the molded article substantially parallel to the axis of rotation of the rotatable mold member, and thereafter ejecting the gate from the mold.

6. In the method of molding an article between complementary mold members and severing the gate attached to the molded article, the steps comprising injecting molding composition into the mold cavity formed by the complementary mold member, setting the molding composition to form a molded article with a gate attached thereto, separating the mold members, rotating one of the mold members while the molded article is held from rotation by frictional engagement with the nonrotating mold member, withdrawing the molded article from the nonrotating mold member, rotating the molded article with the rotatable mold member to apply rotational force to the molded article while positively holding said gate against rotation to thereby sever the gate attached to the article, stripping the molded article from the rotatable mold member by the application of force to the molded article substantially parallel to the axis of rotation of the rotatable mold member, and thereafter ejecting the gate from the mold.

7. In the method of molding an article between complementary mold members and severing the gate attached to the molded article, the steps comprising injecting molding composition into a mold cavity formed by the complementary mold members, setting the molding composition to form a molded article with a gate attached thereto, separating the mold members, applying rotational force to the molded article to rotate the same about its longitudinal axis while positively holding said gate against rotation to thereby sever the gate attached to the article, stripping the molded article from the mold member by the application of force to the molded article substantially normal to the plane of rotation of the molded article, and thereafter ejecting the gate from the mold.

8. In a method of molding an article between complementary mold members, one of which is rotatable, and severing the gate attached to the molded article, the steps comprising injecting molding composition into a mold cavity formed between the complementary mold members, setting the molding composition to form a molded article with a gate attached thereto, separating the mold members, rotating the rotatable mold member while the molded article is frictionally engaged by the nonrotating mold member, removing the molded article from the nonrotating mold member, rotating the molded article with the rotating mold member while positively holding said gate against rotation to thereby sever the gate attached to the molded article, stripping the molded article from the mold by the application of force to the molded article substantially parallel to the axis of rotation of the rotatable mold member, and thereafter ejecting the gate from the mold.

9. In the method of molding an article between complementary mold members and severing the gate attached to the molded article, the steps comprising injecting molding composition through a longitudinal channel into the cavity formed between the complementary mold elements, setting the molding composition to form a molded article with a gate attached thereto, separating the mold members, severing the gate connected to the molded article by applying rotary movement to the molded article with respect to the longitudinal channels while positively holding said gate against rotation, said rotary movement being restricted to a single vertical plane, stripping the molded article from the mold by the application of force to the molded article normal to the plane of rotation of the molded article, and thereafter ejecting the gate from the mold.

GARDINER C. WILSON.

REFERENCES CITED

The following references are of record in the file of this patent:

UNITED STATES PATENTS

| Number | Name | Date |
|---|---|---|
| 2,339,443 | Wilson | Jan. 18, 1944 |
| 2,363,808 | Sayre | Nov. 28, 1944 |